United States Patent [19]

Scott

[11] Patent Number: 4,765,367

[45] Date of Patent: Aug. 23, 1988

[54] VALVE ASSEMBLY

[76] Inventor: Mark E. Scott, 117 Possum Hollow Rd., Wallingford, Pa. 19086

[21] Appl. No.: 881,863

[22] Filed: Jul. 3, 1986

[51] Int. Cl.⁴ .................. F16K 11/07; B60C 21/12
[52] U.S. Cl. ..................... 137/607; 137/597; 137/625.4; 141/38; 222/144.5
[58] Field of Search .............. 137/607, 597, 625.4, 137/625.18, 625.48, 625.49, 630.22, 223, 229, 231; 141/38, 105; 222/144.5, 402.4; 156/97; 152/415

[56] References Cited

U.S. PATENT DOCUMENTS

| | | | |
|---|---|---|---|
| 828,086 | 8/1906 | Bowers | 137/625.4 |
| 1,348,708 | 8/1920 | Garland | |
| 1,732,249 | 10/1929 | Vashon | |
| 1,820,653 | 8/1931 | Ernst | 137/625.48 |
| 2,812,783 | 11/1957 | Bufogle | 141/38 |
| 2,851,052 | 9/1958 | Krantz | 137/625.4 X |
| 2,869,573 | 1/1959 | Stafford | 137/223 |
| 3,043,348 | 7/1962 | Wellsch | 141/38 |
| 3,283,963 | 11/1966 | Boyer et al. | 222/402.24 |
| 3,448,779 | 6/1967 | Horwitt | 141/38 |
| 3,468,339 | 9/1969 | Gray | 137/625.4 |
| 3,515,181 | 6/1970 | Sperberg | 141/38 |
| 3,780,694 | 12/1973 | Wilbur | 116/112 |
| 3,907,012 | 9/1975 | Burke | 141/349 |
| 3,921,665 | 11/1975 | Lebzelter | 137/630.22 X |
| 4,031,688 | 6/1977 | Wasserman | 53/7 |
| 4,146,056 | 3/1979 | Buchanan | 137/597 X |
| 4,168,015 | 9/1979 | Robinette | 222/3 |
| 4,276,898 | 7/1981 | Ross | 141/38 X |
| 4,453,650 | 6/1984 | Witte et al. | 222/43 |
| 4,501,288 | 2/1985 | Field | 137/625.48 X |

FOREIGN PATENT DOCUMENTS 818705  8/1959  United Kingdom ........... 137/625.48

Primary Examiner—Martin P. Schwadron
Assistant Examiner—Stephen M. Hepperle
Attorney, Agent, or Firm—Seidel, Gonda, Goldhammer & Abbott

[57] ABSTRACT

An apparatus for reinflating an object such as a punctured automobile tire. The apparatus including a valve assembly having a housing with two inputs which are connected to an outlet through passageways within the housing. A valve is provided such that the input passageway which receives the output from a compressed air source is connected, in its normal position, to the outlet of the housing for connection to an automobile tire or inflatable object. The second input to the valve assembly is opened by placing the valve in the second position. The second position of the valve closes the first input from the compressor to the outlet and seals the first input from the second input. The second input includes a threaded fitting on an aerosol type can which seals the input to the housing as well as it seals with respect to the can to which it is attached.

2 Claims, 2 Drawing Sheets

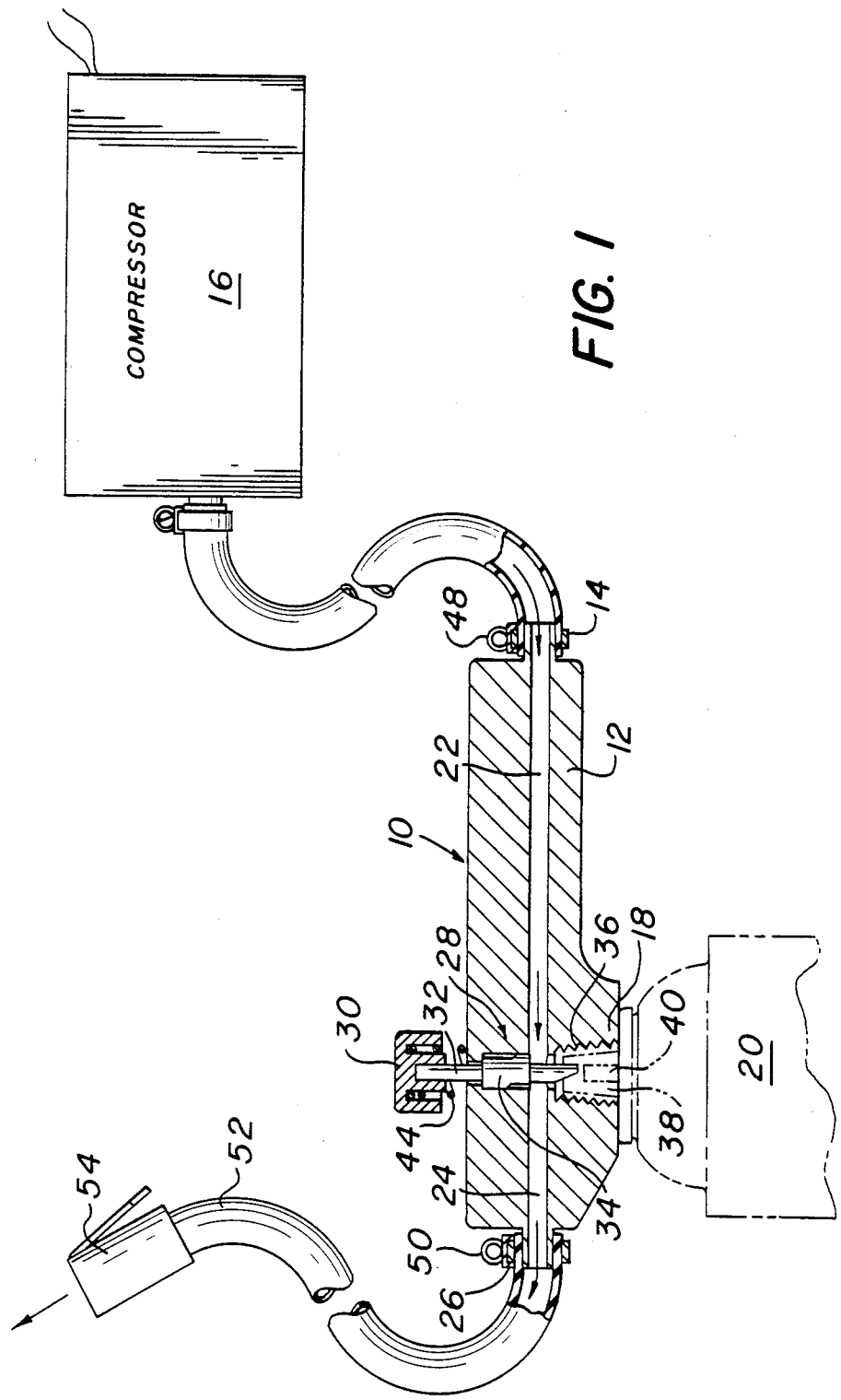

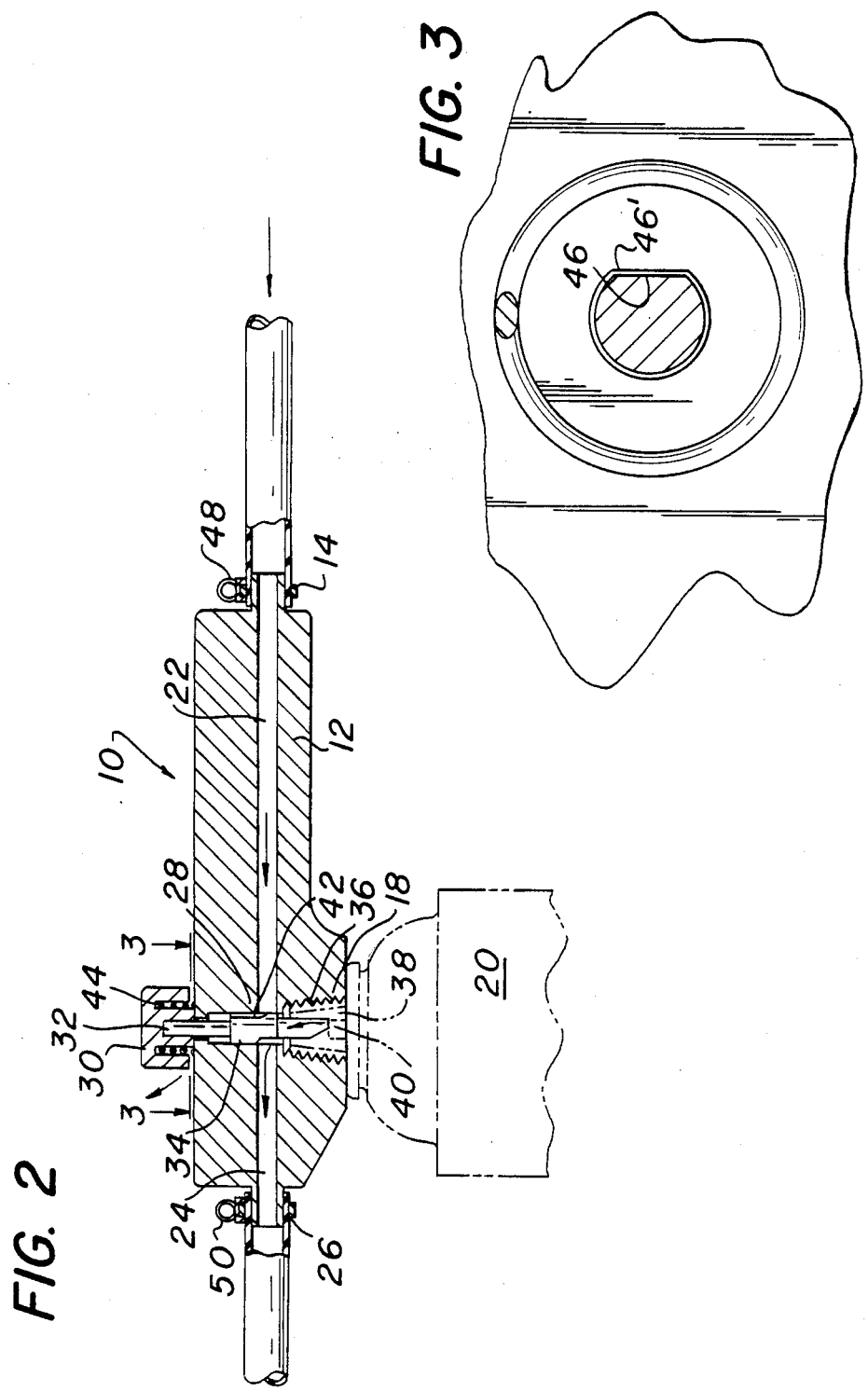

VALVE ASSEMBLY

BRIEF SUMMARY OF THE INVENTION

The present invention relates to a valve assembly for receiving two pressurized inputs and connecting them to a single output. The invention more particularly relates to a valve assembly for receiving both a compressed air input and a aerosol propelled sealant input and controllably directing them through an output to an inflatable device such as a pneumatic tire. The overall concept of the invention is to inflate a flat automobile tire by repairing the leak within the tire with a sealant and re-inflating the tire to proper operational pressure.

BACKGROUND OF THE INVENTION

The re-inflation of pneumatic automobile tires while on the road and away from a service station has been a problem for a number of years. A portable source of pressurized air will only reinflate a tire which has not been damaged or subject to puncture. Aerosol type cans which include a sealant for sealing minor punctures or leaks do not create enough pressure to fully reinflate the typical pneumatic tire to its normal operating pressure. The present invention relates to means for reinflation of a penumatic-type tire as well as providing a sealant for punctures or other leaks.

SUMMARY OF THE INVENTION

The present invention utilizes a compressed gas or air source and an aerosol propelled sealant for sealing and reinflating a flat tire. A valve assembly is provided for connection to both the gas and the aerosol input and for selectively controlling their output into the tire or other such pneumatic device. The normally open condition of the assembly connects the output to the compressed gas input. Depression of a valve stem places the valve assembly in a second position which seals the gas input from the output and from the aerosol input. Pressure relief for the compressed gas through the valve assembly housing maybe provided in the second position. Sealant is moved from the aerosol input to the output by means of its aerosol propellant through the housing and the output. The sealant closes punctures or other minor leaks within the tire while the compressed gas input reinflates the sealed tire to the desired operating pressure. The source of the compressed gas or air may be provided from a compressor which is powered by vehicle battery power or from a portable storage tank, so that tires may be repaired and then fully reinflated on the road and normal driving may be continued without causing further damage to the tire.

Further advantages of the invention will become apparent by particularly pointing out a preferred embodiment of the invention. For the purpose of illustrating the invention, there is shown in the drawings a form which is presently preferred; it being understood, however, that this invention is not limited to the precise arrangements and instrumentalities shown.

BRIEF DESCRIPTION OF THE DRAWINGS

FIG. 1 shows a cross-sectional view of an embodiment of the invention in its normal operating condition.

FIG. 2 shows a second cross-sectional view of the invention shown in FIG. 1 in its second operating condition.

FIG. 3 shows a cross section of the invention taken along line 3—3 in FIG. 2.

DETAILED DESCRIPTION OF THE DRAWINGS

In the drawings, where like numerals indicate like elements, there is shown in the Figures a valve assembly which is generally referred to by the numeral 10. The valve assembly 10 includes a housing 12 having a first input 14, which is normally connected to an air compressor 16 or other pressurized air or gas source, and a second inlet or input 18, which is normally connected to a sealant source 20 typically an aerosol-type can. The housing 12 includes an inlet passageway 22 which connects the first input 14 to an outlet passageway 24 and an outlet 26. The second input 18 also connects to the outlet passageway 24 and the outlet 26 through housing 12. A valve 28 is provided at the connection between the inlet passageway 22, the second input 18 and the outlet passageway 24. The valve 28 is actuated by means of a valve cap 30 which is positioned above the housing 12. A plunger 32 projects through the housing 12 and provides a seat for the valve cap 30. A valve head 34 on the plunger 32 provides the valve action between the two inputs 14 and 18 and the output 26.

The valve 28 preferably includes two operable positions. The first positon or normally open position, as shown in FIG. 1, connects the input 14 and passageway 22 to the outlet passageway 24 and the outlet 26. Additionally, in the first valve position, the second input 18 is closed with respect to the outlet passageway 24 and outlet 26. Additionally, the connection sealant source 20 at inlet 18 must prevent exhaustion of the pressurized gas from the compressor 16 through inlet 18.

In the embodiment shown in the drawings, the second input 18 includes a threaded bore 36 within the housing 12. An externally threaded fitting 38 is attached to the aerosol propelled sealant source 20 and is threaded into bore 36. In the first or normal position, the valve stem 40 of the sealant source 20 is closed such that sealant is not introduced from the can into the housing 12 and the compressed air is not fed into the aerosol can 20. Preferably the fitting 38 provides an air tight seal between the housing 12 at inlet 18 and/or between the can portion of the sealant source 20, so that the pressurized air or gas is not exhausted out of input 18 in the first position.

The second position of the valve 28, as shown in FIG. 2, is created by depressing the valve cap 30 towards the top of the housing 12. This actuation of the valve 28 causes a corresponding movement of the plunger 32 and the valvehead 34. In the second position the compressor input 14 is closed with respect to the outlet passageway 24 and an opening is provided between the second input 18 and the outlet passageway 24. Depression of the valve cap 30 and plunger 32 also causes depression of the valve stem 40 of the aerosol type sealant source 20 to release the sealant into inlet 18 and exhaust through passageway 24 and outlet 26. Additionally, an opening is made between the compressor passageway 22 and the outside of the housing 12 so as to provide a pressure release 42 for the compressed gas within the passageway 22. This pressure release is provided by means of groove 42 on valve head 34. Thus, in the second position the only sealant source 20 is connected to the outlet passageway 24. Connection should not be possible from the sealant source 20 through the housing 12 to the compressor 16. The valve 28 will return to the first or normal condition, as shown in FIG. 1, by means of spring 44 under cap 30.

As shown in FIG. 3 the plunger 32 is retained within the housing 12 in a non-rotatable condition. Plunger 32 includes a flat side 46 which engages a corresponding flat side 46' in housing 12 so as to prevent rotation of the plunger 32 about its longitudinal axis and also prevent rotation of the valve head 34 within the valve 28. Thus, the outlet portion of the valve head 34 corresponding to inlet 18 and the groove 42 corresponding to the pressure release each remain aligned within the housing 12 for proper operation.

Typically, the first input 14 will be threaded or include a clamp 48 to receive the corresponding tubing of a typical compressor 16 which operates on a 12 V DC source of the typical automobile. Outlet 26 may also be threaded similar to input 14 or may be provided with a permanent fixture or clamp 50 to attach a flexible hose 52 to the assembly. The opposite end of the hose 52 includes an attachment means 54 for connection with the valve stem of an inflatable tire or other object to be inflated and sealed.

A valve assembly 10 as described above and as contemplated by this invention permits reinflation of an automobile tire which has become flat due to a puncture or minor leak in its casing. The sealant is typically a latex-type material which coagulates around and closes the perforation in the tire. Typically, such sealants are provided in cans which include an aerosol type propellant. The typical can does not create sufficient pressure to reinflate the tire to its proper operating condition. The compressor is utilized in the present invention to supply air to reinflate the tire to normal operating condition after sealing. The operation of the valve assembly 10 provides a fast and easy connection between the sealant and the compressor for reinflation of a number of tires. The sealant may be supplied in sufficient amounts to seal the tire and maintain it in the sealed condition. Additional sealant may be provided for later use or as supplies are required by replacing the sealant source 20 attached to the assembly with a new supply so as to be prepared for possible future use of the assembly for other flat tires. By providing matching threads on the fitting 38 of the sealant source 18 and the bore 36 within the second input 18 of the housing 12, the reuse of the assembly upon exhaustion of the first sealant is permitted. Additionally, for tire perforations which may require more than one can of sealant for proper sealing only the sealant can is required to be removed and replaced from the assembly 10.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus comprising:
   means for receiving a supply of pressurized gas; means for receiving an aerosol type can containing a sealant, said sealant-receiving means comprising an internally threaded bore for receiving a correspondingly threaded fitting of an aerosol type can; outlet means adapted for connection to an inflatable object; valve means having a first position connecting the pressurized gas-receiving means to the outlet means, and a second position connecting the sealant-receiving means with the outlet means and closing the connection from the pressureized gas-receiving means to the outlet means; means to prevent connection from the sealant-receiving means to the gas receiving means when the valve is in the second position; and an aerosol-type can having a threaded fitting engaging said threaded bore, said threaded fitting having positioned adjacent thereto a valve portion activatable by the valve means when the valve means is in the second position.

2. An apparatus as claimed in claim 1 wherein the threaded fitting is adapted to prevent exhaustion of sealant or compressed gas through the connection with the aerosol type can.

* * * * *